United States Patent
Winkel

(10) Patent No.: US 10,480,405 B2
(45) Date of Patent: Nov. 19, 2019

(54) METHOD FOR COUPLING TWO SUB-SHAFTS

(71) Applicant: Siemens Aktiengesellschaft, Munich (DE)

(72) Inventor: Michael Winkel, Dorsten (DE)

(73) Assignee: Siemens Aktiengesellschaft, Munich (DE)

( * ) Notice: Subject to any disclaimer, the term of this patent is extended or adjusted under 35 U.S.C. 154(b) by 68 days.

(21) Appl. No.: 15/750,594

(22) PCT Filed: Jun. 30, 2016

(86) PCT No.: PCT/EP2016/065293
§ 371 (c)(1),
(2) Date: Feb. 6, 2018

(87) PCT Pub. No.: WO2017/029007
PCT Pub. Date: Feb. 23, 2017

(65) Prior Publication Data
US 2019/0010865 A1 Jan. 10, 2019

(30) Foreign Application Priority Data
Aug. 14, 2015 (EP) ..................................... 15181087

(51) Int. Cl.
*F02C 6/02* (2006.01)
*F01D 13/00* (2006.01)
(Continued)

(52) U.S. Cl.
CPC .............. *F02C 6/02* (2013.01); *F01D 13/003* (2013.01); *F01D 19/00* (2013.01); *F02C 7/36* (2013.01);
(Continued)

(58) Field of Classification Search
CPC .. F02C 6/02; F02C 7/36; F01D 13/003; F01D 19/00
See application file for complete search history.

(56) References Cited

U.S. PATENT DOCUMENTS

| 4,204,401 A | * | 5/1980 | Earnest | F01K 23/10 60/39.181 |
| 5,502,650 A | | 3/1996 | Naruse et al. | |

(Continued)

FOREIGN PATENT DOCUMENTS

| EP | 1503047 A1 | 2/2005 |
| EP | 1911939 A1 | 4/2008 |

(Continued)

OTHER PUBLICATIONS

International Search Report and Written Opinion with English translation dated Oct. 7, 2016, for PCT/EP2016/065293.
(Continued)

*Primary Examiner* — Woody A Lee, Jr.
(74) *Attorney, Agent, or Firm* — Beusse Wolter Sanks & Maire

(57) ABSTRACT

A method for coupling a first sub-shaft, which has a first turbomachine and a generator connected to a mains supply, to a second sub-shaft, which has a second turbomachine, by means of an overrunning clutch, has the following steps: a) rotating the second sub-shaft with a starting rotational speed which is lower than the rotational speed of the first sub-shaft; b) measuring the mains frequency of the mains supply; c) measuring a differential angle between the first sub-shaft and the second sub-shaft; d) accelerating the second sub-shaft with an acceleration value which is produced using the mains frequency measured in step b), the differential angle and the starting rotational speed, and therefore the overrun-
(Continued)

ning clutch couples the two sub-shafts to each other with a previously determined target coupling angle.

10 Claims, 1 Drawing Sheet

(51) Int. Cl.
*F01D 19/00* (2006.01)
*F02C 7/36* (2006.01)
*F16D 48/00* (2006.01)

(52) U.S. Cl.
CPC .......... *F16D 48/00* (2013.01); *F05D 2220/72* (2013.01); *F05D 2260/40* (2013.01); *F05D 2260/85* (2013.01); *F05D 2260/96* (2013.01); *F05D 2270/023* (2013.01); *F05D 2270/304* (2013.01); *F16D 2300/22* (2013.01); *F16D 2500/30816* (2013.01); *F16D 2500/30818* (2013.01); *F16D 2500/30825* (2013.01)

(56) References Cited

U.S. PATENT DOCUMENTS

| | | | | |
|---|---|---|---|---|
| 2003/0182944 | A1* | 10/2003 | Hoffman | F01K 23/10 60/772 |
| 2007/0095072 | A1* | 5/2007 | Olmes | F02C 3/22 60/806 |
| 2009/0320493 | A1 | 12/2009 | Olia et al. | |
| 2009/0325765 | A1 | 12/2009 | Humer et al. | |
| 2010/0032964 | A1 | 2/2010 | Hoffmann et al. | |
| 2011/0304159 | A1 | 12/2011 | Juretzek | |
| 2014/0199157 | A1* | 7/2014 | Haerms | F01D 21/06 415/1 |
| 2015/0059347 | A1 | 3/2015 | Clayton et al. | |
| 2016/0130983 | A1* | 5/2016 | Zimmer | F01K 23/16 477/6 |

FOREIGN PATENT DOCUMENTS

| | | |
|---|---|---|
| EP | 2813675 A1 | 12/2014 |
| JP | H05284689 A | 10/1993 |
| JP | 2010007665 A | 1/2010 |
| JP | 2010518320 A | 5/2010 |
| RU | 2011129619 A | 1/2013 |

OTHER PUBLICATIONS

EP Search Report dated Feb. 12, 2016, for EP patent application No. 15181087.6.

* cited by examiner

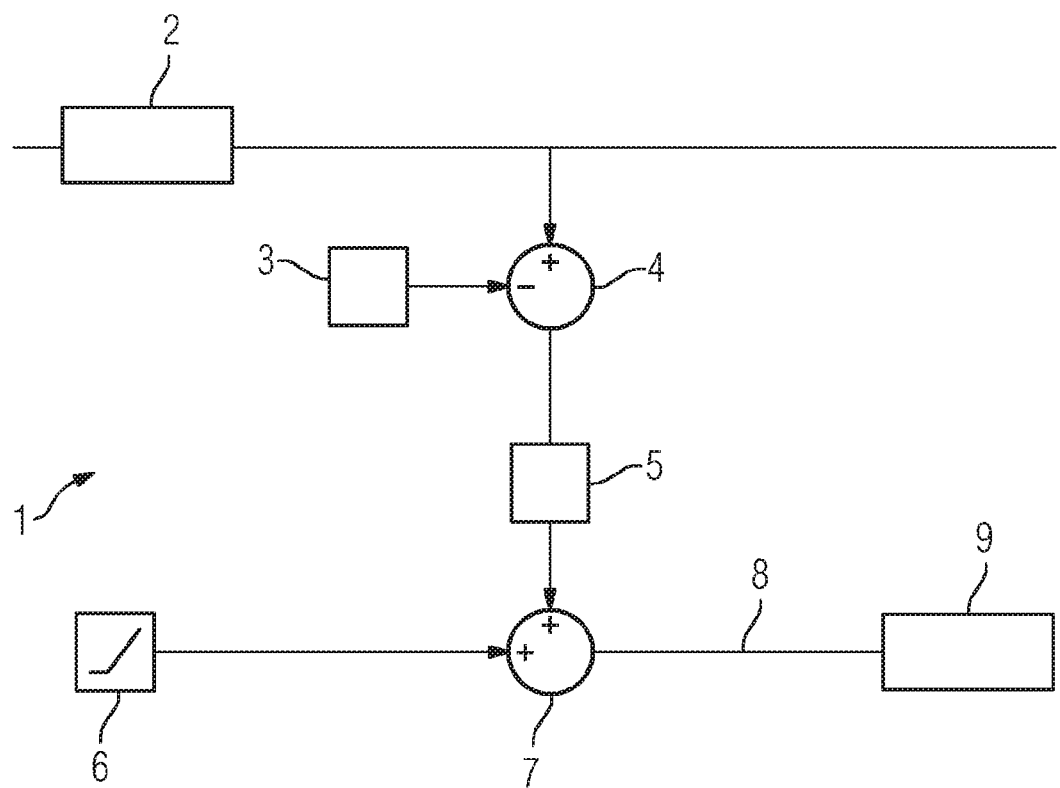

METHOD FOR COUPLING TWO SUB-SHAFTS

CROSS REFERENCE TO RELATED APPLICATIONS

This application is the US National Stage of International Application No. PCT/EP2016/065293 filed Jun. 30, 2016, and claims the benefit thereof. The International Application claims the benefit of European Application No. EP15181087 filed Aug. 14, 2015. All of the applications are incorporated by reference herein in their entirety.

FIELD OF INVENTION

The present invention relates to a method for coupling a first sub-shaft, which has a first fluid-flow machine and a generator connected to a mains supply, to a second sub-shaft, which has a second fluid-flow machine, by means of an overrunning clutch.

BACKGROUND OF INVENTION

A shaft train in fluid-flow machines, such as in a power plant, can be excited to vibrate as the shaft train rotates. The vibrations of the shaft train are disadvantageous, however, since they shorten the service life of the shaft train.

With the aid of a clutch, the shaft train can be subdivided into sub-shafts, wherein the sub-shafts can rotate independently of one another when decoupled and rotate together when coupled. For example, a sub-shaft can have a gas turbine, with the waste heat from which a steam turbine of the other sub-shaft is driven. When the gas turbine is started up, there is not yet sufficient waste heat available to drive the steam turbine. In order to suppress ventilation within the steam turbine, the two sub-shafts are conventionally coupled to each other only when the sub-shaft having the steam turbine has been accelerated to the rotational speed of the sub-shaft having the gas turbine. Likewise, for example, in a combined heat and steam power plant, two sub-shafts each having a steam turbine can be coupled and uncoupled by means of a clutch. When a large quantity of steam is removed for a discharge of heat from the combined heat and steam power plant, the sub-shafts can be uncoupled, so that steam does not have to flow through one of the two steam turbines.

It has transpired that the vibratory behavior of the shaft train depends on the coupling angle of the two sub-shafts. Conventionally, the two sub-shafts are repeatedly uncoupled and coupled until a desired target coupling angle with a low vibratory loading is established. Here, however, the desired target coupling angle is only achieved by accident and, at the same time, also only with a low degree of accuracy.

SUMMARY OF INVENTION

An objective technical object is therefore to devise a method for coupling two sub-shafts in which a desired target coupling angle of the two sub-shafts is achieved reliably and with high accuracy.

The method according to the invention for coupling a first sub-shaft, which has a first fluid-flow machine and a generator connected to a mains supply, to a second sub-shaft, which has a second fluid-flow machine, by means of an overrunning clutch comprises the steps: a) rotating the second sub-shaft with an initial rotational speed which is lower than the rotational speed of the first sub-shaft; b) measuring the mains frequency of the mains supply; c) measuring a differential angle between the first sub-shaft and the second sub-shaft; d) accelerating the second sub-shaft with an acceleration value which is produced by using the mains frequency measured in step b), the differential angle and the initial rotational speed, so that the overrunning clutch couples the two sub-shafts to each other with a previously determined target coupling angle.

By means of the overrunning clutch, the coupling of the two sub-shafts is carried out when the second sub-shaft is accelerated in step d) to rotational speeds which are higher than the rotational speed of the first sub-shaft. By using the method according to the invention, the previously determined target coupling angle can advantageously be achieved reliably and with high accuracy. The target coupling angle is predetermined in such a way that the vibrations during operation of the coupled sub-shafts are as low as possible. For this purpose, for example, the vibrations can be determined computationally for different target coupling angles, in particular by means of a finite element method, and the target coupling angle at which the lowest stress loading of the two coupled sub-shafts occurs can then be selected. It is likewise conceivable for the vibrations to be determined experimentally at different target coupling angles and, from the experimental data, for that target coupling angle at which the lowest stress loading occurs to be selected.

The method advantageously comprises the steps: e) measuring a new mains frequency during the accelerations of the second sub-shaft; f) in the event that the new mains frequency is different from the mains frequency measured in step b), accelerating the second sub-shaft with a changed acceleration value, which is produced by using the new mains frequency. As a result, advantageously fluctuations of the mains frequency and therefore fluctuations of the rotational speed of the first sub-shaft which occur during the coupling of the two sub-shafts can advantageously be compensated, which means that the previously determined target coupling angle can be achieved with a particularly high accuracy. To determine the changed acceleration value, in addition to the new mains frequency, the rotational speed of the second sub-shaft and a new differential angle which are present at the time at which the new mains frequency is measured can be used. For the rotational speed of the second sub-shaft, for example, it is possible for a measured rotational speed or a set point of a rotational speed control system of the second sub-shaft to be used. It is advantageous for the method to comprise the step: g) repeating steps e) and f) at least once, in particular repeating the steps e) and f) continuously. As a result, the accuracy with which the previously determined target coupling angle is achieved can be increased still further.

It is advantageous for the mains frequency to be measured electrically and/or by measuring the rotational speed of the first sub-train. In particular, electrical measurement constitutes a simple method for measuring the mains frequency.

The method advantageously comprises the steps: b1) forming a difference between the mains frequency and a reference mains frequency; c1) determining an initial acceleration value by using the differential angle, the initial rotational speed and the reference mains frequency; wherein in step d) the acceleration value is determined by using the initial acceleration value and the difference. By means of these method steps, the initial acceleration value is calculated for the case in which the mains frequency does not deviate from the reference mains frequency. By forming the difference, deviations of the mains frequency from the reference mains frequency can be detected particularly easily. The deviations can be corrected by using the difference, which advantageously constitutes a simple method which is less computationally complicated.

Alternatively, it is advantageous for step d) to be carried out as soon as the differential angle measured in step c) is equal to a reference differential angle. Thus, the second sub-shaft is parked at the initial rotational speed until the reference differential angle is established. The method is advantageously then carried out with the steps: b1) forming a difference between the mains frequency and a reference mains frequency; c1) determining an initial acceleration value by using the reference differential angle, the initial rotational speed and the reference mains frequency; wherein in step d) the acceleration value is determined by using the initial acceleration value and the difference. Since the initial acceleration value is calculated only once for the reference differential angle, this constitutes a computationally particularly simple method.

It is advantageous for the initial rotational speed and the acceleration value to be entered as set points into a rotational speed control system of the second sub-shaft. It is advantageous for the first fluid-flow machine to be a gas turbine and for the second fluid-flow machine to be a steam turbine. Alternatively, it is advantageous for the first fluid-flow machine to be a steam turbine and the second fluid-flow machine to be a steam turbine.

In the following text, the invention will be explained in more detail by using the appended schematic drawing. The FIGURE shows a logical scheme for implementing the method.

In the method, a first sub-shaft, which has a first fluid-flow machine and a generator connected to a mains supply, is coupled to a second sub-shaft, which has a second fluid-flow machine. For the coupling, use is made of an overrunning clutch, which couples the two sub-shafts to each other when the second sub-shaft is accelerated to rotational speeds which are higher than the rotational speed of the first sub-shaft. For example, the first fluid-flow machine can be a gas turbine and the second fluid-flow machine can be a steam turbine. In another example, the first fluid-flow machine can be a steam turbine and the second fluid-flow machine can be a steam turbine. It is likewise conceivable for the first sub-shaft to have a plurality of fluid-flow machines and/or for the second sub-shaft to have a plurality of fluid-flow machines.

BRIEF DESCRIPTION OF THE DRAWINGS

In order to illustrate the method, the FIGURE illustrates a logical scheme 1 for implementing the method.

DETAILED DESCRIPTION OF INVENTION

Firstly, the second sub-shaft is rotated with an initial rotational speed which is lower than the rotational speed of the first sub-shaft. The initial rotational speed can be about 0.5 Hz to 1.5 Hz, in particular 0.9 Hz to 1.1 Hz, lower than a reference mains frequency. This ensures that, even in the event of typically occurring fluctuations of the rotational speed of the first sub-shaft, the second sub-shaft is slower than the first sub-shaft at the initial rotational speed. The reference mains frequency 3 is, for example, 50 Hz or 60 Hz. The initial rotational speed can be entered as a set point into a rotational speed control system 9 of the second sub-shaft.

As can be seen from the FIGURE, the mains frequency 2 of the mains supply is measured. This can be done electrically or by measuring the rotational speed of the first sub-shaft. A difference 4 is then formed between the mains frequency 2 and the reference mains frequency 3 of the mains supply. The difference 4 is processed further in a processing step 5. For example, scaling, an offset shift or integration of the difference can be carried out. In addition, an initial acceleration value 6, which is produced by using the initial rotational speed and the reference mains frequency, is determined. By using the initial acceleration value 6, a rotational speed set point is calculated. In order to determine the rotational speed set point, the duration of an acceleration starting time is also used. In order to find a suitable acceleration starting time for accelerating the second sub-shaft, the second sub-shaft can be kept at the initial rotational speed until the differential angle is equal to a reference differential angle. In this case, the reference differential angle is also used for determining the initial acceleration value 6. Alternatively, the second sub-shaft can be accelerated at an arbitrary acceleration starting time. In this case, the differential angle measured at the arbitrary time is also used in order to determine the initial acceleration value 6.

The initial acceleration value 6 can, for example, be determined experimentally. For this purpose, the angle covered during a coupling process between the first sub-shaft and the second sub-shaft, and also the mains frequency, can be measured in a time-resolved manner. From the deviations of the mains frequency, occurring during the coupling operation, from the reference mains frequency and the angle covered, the initial acceleration value 6 can be deduced.

In a correction step 7, the rotational speed set point is corrected with the difference processed in the processing step 5, which results in a corrected rotational speed set point 8. For example, in the processing step 5, the difference can be multiplied by a factor 1 and, in the correction step 7, the difference can be added to the rotational speed set point, which forms the corrected rotational speed set point 8. This can be done continuously, for example. The corrected rotational speed set point 8 is entered as a set point into the rotational speed control system 9 of the second sub-shaft, so that the second sub-shaft is accelerated and the two sub-shafts are coupled to each other.

It is conceivable for a new mains frequency to be measured during the accelerations of the second sub-shaft. In the event that the new mains frequency is different from the previously measured mains frequency, the second sub-shaft is accelerated with a changed acceleration value, which is produced by using the new mains frequency. Furthermore, the rotational speed of the second sub-shaft and a new differential angle, which are present at the time at which the new mains frequency is measured, are used. For the rotational speed, the reference rotational speed from the rotational speed control system or a measured rotational speed can be used. It is also conceivable that this is carried out many times when accelerating the second sub-shaft or continuously when accelerating the second sub-shaft.

Although the invention has been illustrated and described in detail by means of the preferred exemplary embodiment, the invention is not restricted by the disclosed examples, and other variations can be derived therefrom by those skilled in the art without departing from the protective scope of the invention.

The invention claimed is:

1. A method for coupling a first sub-shaft, which has a first fluid-flow machine and a generator connected to a mains supply, to a second sub-shaft, which has a second fluid-flow machine, by means of an overrunning clutch, comprising the steps:

a) rotating the second sub-shaft with an initial rotational speed which is lower than the rotational speed of the first sub-shaft;
b) measuring the mains frequency of the mains supply;
c) measuring a differential angle between the first sub-shaft and the second sub-shaft;
d) accelerating the second sub-shaft with an acceleration value which is produced by using the mains frequency measured in step b), the differential angle and the initial rotational speed, so that the overrunning clutch couples the two sub-shafts to each other with a previously determined target coupling angle;
e) measuring a new mains frequency during the accelerations of the second sub-shaft;
f) in the event that the new mains frequency is different from the mains frequency measured in step b), accelerating the second sub-shaft with a changed acceleration value, which is produced by using the new mains frequency.

2. The method as claimed in claim 1, further comprising the step:
g) repeating steps e) and f) at least once.

3. The method as claimed in claim 1,
wherein the mains frequency is measured electrically and/or by measuring the rotational speed of the first sub-shaft.

4. The method as claimed in claim 1, further comprising the steps:
b1) forming a difference between the mains frequency and a reference mains frequency;
c1) determining an initial acceleration value by using the differential angle, the initial rotational speed and the reference mains frequency;
wherein in step d) the acceleration value is determined by using the initial acceleration value and the difference.

5. The method as claimed in claim 1,
wherein step d) is carried out as soon as the differential angle measured in step c) is equal to a reference differential angle.

6. The method as claimed in claim 5, further comprising the steps:
b1) forming a difference between the mains frequency and a reference mains frequency;
c1) determining an initial acceleration value by using the reference differential angle, the initial rotational speed and the reference mains frequency;
wherein in step d) the acceleration value is determined by using the initial acceleration value and the difference.

7. The method as claimed in claim 1,
wherein the initial rotational speed and the acceleration value are entered as set points into a rotational speed control system of the second sub-shaft.

8. The method as claimed in claim 1,
wherein the first fluid-flow machine is a gas turbine and the second fluid-flow machine is a steam turbine.

9. The method as claimed in claim 1,
wherein the first fluid-flow machine is a steam turbine and the second fluid-flow machine is a steam turbine.

10. The method as claimed in claim 1, further comprising the step:
g) repeating steps e) and f) continuously.

* * * * *